(12) United States Patent
Hessling-von Heimendahl et al.

(10) Patent No.: US 12,337,755 B2
(45) Date of Patent: Jun. 24, 2025

(54) ELONGATED AIRCRAFT CABIN LIGHT, AIRCRAFT COMPRISING AN ELONGATED AIRCRAFT LIGHT, AND METHOD OF ILLUMINATING A PASSENGER CABIN OF AN AIRCRAFT

(71) Applicant: Goodrich Lighting Systems GmbH & Co. KG, Lippstadt (DE)

(72) Inventors: Andre Hessling-von Heimendahl, Koblenz (DE); Carsten Pawliczek, Lippstadt (DE); Björn Schallenberg, Geseke (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/787,771

(22) Filed: Jul. 29, 2024

(65) Prior Publication Data
US 2025/0050804 A1    Feb. 13, 2025

(30) Foreign Application Priority Data
Aug. 9, 2023 (EP) .................................. 23190619.9

(51) Int. Cl.
*B60Q 3/43* (2017.01)
*B60Q 3/62* (2017.01)
*B64D 11/00* (2006.01)

(52) U.S. Cl.
CPC ................. *B60Q 3/43* (2017.02); *B60Q 3/62* (2017.02); *B64D 11/00* (2013.01); *B60Q 2800/30* (2022.05); *B64D 2011/0038* (2013.01); *B64D 2011/0053* (2013.01); *B64D 2203/00* (2013.01)

(58) Field of Classification Search
CPC ........ B64D 2011/0038; B64D 2203/00; B64D 2011/0053; F21Y 2115/10; B60Q 3/43; B60Q 2800/30
See application file for complete search history.

(56) References Cited

U.S. PATENT DOCUMENTS

| | | | |
|---|---|---|---|
| 6,203,180 B1 | 3/2001 | Fleischmann | |
| 9,193,300 B2 | 11/2015 | Aruga et al. | |
| 10,556,706 B2 | 2/2020 | Johannessen et al. | |
| 2010/0019689 A1 | 1/2010 | Shan | |
| 2013/0188344 A1 | 7/2013 | Dobler et al. | |
| 2016/0091173 A1 | 3/2016 | Camp, III | |

FOREIGN PATENT DOCUMENTS

| | | |
|---|---|---|
| JP | 2020082747 | 6/2020 |
| KR | 101564308 | 10/2015 |
| WO | 2017084939 | 5/2017 |

OTHER PUBLICATIONS

European Patent Office; European Search Report dated Jan. 2, 2024 in Application No. 23190619.9.

*Primary Examiner* — Robert J May
(74) *Attorney, Agent, or Firm* — SNELL & WILMER L.L.P.

(57) ABSTRACT

An elongated aircraft cabin light for illuminating a passenger cabin of an aircraft from a ceiling of the passenger cabin comprises: a row arrangement of a plurality of light modules, extending along a longitudinal direction (L) of the elongated aircraft cabin light. Each of the plurality of light modules comprises at least one light source. The plurality of light modules include a plurality of intermediate light modules and, on at least one end of the row arrangement, an end light module. Each of the plurality of intermediate light modules is configured for emitting a downward light output and at least one lateral light output towards at least one lateral side.

15 Claims, 5 Drawing Sheets

ELONGATED AIRCRAFT CABIN LIGHT, AIRCRAFT COMPRISING AN ELONGATED AIRCRAFT LIGHT, AND METHOD OF ILLUMINATING A PASSENGER CABIN OF AN AIRCRAFT

CROSS-REFERENCE TO RELATED APPLICATIONS

This application claims priority to EP Patent Application No. 23190619.9, filed Aug. 9, 2023 and titled "ELONGATED AIRCRAFT CABIN LIGHT, AIRCRAFT COMPRISING AN ELONGATED AIRCRAFT LIGHT, AND METHOD OF ILLUMINATING A PASSENGER CABIN OF AN AIRCRAFT," which is incorporated by reference herein in its entirety for all purposes.

FIELD

The present invention is in the field of interior aircraft lights, in particular in the field of aircraft cabin lights. The present invention is in particular related to an elongated aircraft cabin light, to an aircraft comprising an elongated aircraft cabin light, and to a method of illuminating a passenger cabin of an aircraft with an elongated aircraft cabin light.

BACKGROUND

Passenger aircraft, such as commercial airplanes, comprising a passenger cabin with passenger seats, are usually equipped with passenger cabin lights for illuminating the passenger cabin.

Passenger cabin lights may in particular include elongated aircraft cabin lights, extending along a longitudinal direction of the passenger cabin, for example along a wall, along a ceiling, along a handrail, or along a floor of the passenger cabin.

Conventional aircraft cabin lighting systems are not always satisfactory. In particular, they often add a large amount of weight to the aircraft and often need a large amount of electric power for illuminating the passenger cabin.

It would therefore be beneficial to provide an aircraft cabin light that allows for the provision of an overall more weight-efficient and/or more power-efficient implementation of the aircraft cabin lighting system.

SUMMARY

Exemplary embodiments of the invention include an elongated aircraft cabin light for illuminating a passenger cabin of an aircraft from a ceiling of the passenger cabin. The elongated aircraft cabin light comprises: a row arrangement of a plurality of light modules extending substantially horizontally along a longitudinal direction of the elongated aircraft cabin light. The row arrangement of the plurality of light modules may in particular extend substantially horizontally along a ceiling of the passenger cabin, which is to be illuminated. Each of the plurality of light modules comprises at least one light source, in particular at least one LED.

The plurality of light modules include a plurality of intermediate light modules and at least one end light module. The at least one end light module is arranged on at least one end of the row arrangement of the plurality of light modules. In particular, a first end light module may be arranged on a first end of the row arrangement of the plurality of light modules and a second end light module may be arranged on a second end of the row arrangement of the plurality of light modules. It is also possible that only one end light module is provided and that the one end light module is arranged on one of the ends of the row arrangement of the plurality of light modules. In general, it can be said that, on at least one end of the row arrangement, an end light module is provided. The features described herein with the respect to the end light module may apply to an end light module provided on one end of the row arrangement or to both light light modules provided on the two ends of the row arrangement.

Each of the plurality of intermediate light modules is configured for emitting a first light output in a first direction, in particular a downward light output in a downward direction, which is oriented downwards with respect to the horizontally extending longitudinal direction of the elongated aircraft cabin light. The first light output/downward light output is provided for illuminating a floor of the passenger cabin. Each of the plurality of intermediate light modules is further configured for emitting at least one lateral light output towards at least one lateral side in at least one lateral direction, which is oriented transverse to the horizontally extending longitudinal direction of the elongated aircraft cabin light. The at least one lateral light output is provided for illuminating a cabin wall and/or overhead luggage bin(s) or their covers.

The end light module is configured for emitting a supplementary light output in the first direction, in particular a supplementary downward light output in the downward direction, and a second light output in a second direction, in particular an upward light output for illuminating a ceiling of the passenger cabin, which is emitted from an end face of the end light module in the longitudinal direction. The at least one end light module is further configured for emitting at least one supplementary lateral light output towards at least one lateral side in at least one lateral direction.

The second light output/upward light output has a maximum light output intensity in a main upward light output direction, which is angled with respect to the longitudinal direction of the elongated aircraft cabin light. The main upward light output direction is in particular angled upwards with respect to the longitudinal direction of the elongated aircraft cabin light.

Exemplary embodiments of the invention further include a method of illuminating a passenger cabin of an aircraft with an elongated aircraft cabin light, which is mounted to a ceiling of the passenger cabin, wherein the method comprises: with each of a plurality of intermediate light modules of the elongated aircraft cabin light providing, a downward light output for illuminating a floor portion of the passenger cabin and providing at least one lateral light output towards at least one lateral side for illuminating a cabin wall and/or one or more overhead luggage bins. The method further comprises: with at least one end light module of the elongated aircraft cabin light, providing a supplementary downward light output for illuminating a floor portion of the passenger cabin, providing at least one supplementary lateral light output towards at least one lateral side for illuminating a cabin wall and/or one or more overhead luggage bins, and providing an upward light output for illuminating a ceiling portion of the passenger cabin forward and/or aft of the elongated aircraft cabin light.

An elongated aircraft cabin light according to an exemplary embodiment of the invention allows for emitting at least three different light outputs, including a downward light output, an upward light output and at least one lateral light output, from a single elongated aircraft cabin light, using a jointly assembled set of light source(s) and a jointly assembled set of optical elements for forming the plurality of light outputs. As compared to previous approaches, where different light units with dedicated light outputs were used for illuminating the floor, the ceiling, the side wall, and the overhead luggage bins, the overall weight and cost for the aircraft cabin lighting system/for the illumination equipment, which is installed for illuminating the passenger cabin of an aircraft, may be considerably reduced. The amount of electric power consumed for illuminating the passenger cabin may be reduced as well.

In an embodiment, the elongated aircraft cabin light comprises two end light modules. Each end light module may be configured as described above. The two end light modules may be arranged on opposite ends of the elongated aircraft cabin light, with the intermediate light modules being arranged between the two end light modules. An elongated aircraft cabin light comprising two end light modules is capable to emit an upward light output from each end of the elongated aircraft cabin light, respectively. As a result, the passenger cabin, in particular the ceiling of the passenger cabin, may be illuminated even more completely and more efficiently.

In an embodiment, the elongated aircraft cabin light comprises between two and 10 intermediate light modules.

In an embodiment, the elongated aircraft cabin light has a length along its longitudinal direction in the range of between 50 mm and 250 mm, in particular a length in the range of between 100 mm and 200 mm.

In an embodiment, the elongated aircraft cabin light has a width in the range of between 10 mm and 25 mm, in particular a width in the range of between 15 mm and 20 mm.

In an embodiment, the elongated aircraft cabin light has a height in the range of between 10 mm and 50 mm, in particular a height in the range of between 10 mm and 30 mm.

In an embodiment, each of the plurality of intermediate light modules comprises at least one light directing element for directing at least a portion of the light, emitted by the at least one light source of the respective intermediate light module, in a downward direction, i.e. towards the floor of the passenger cabin. Each of the plurality of intermediate light modules may in particular comprise two light directing elements. The two light directing elements may be arranged, facing each other, at opposite ends of the intermediate light module along the longitudinal direction. Such light directing elements have been found as well suited for efficiently generating highly uniform downward light outputs of the elongated aircraft cabin light.

In an embodiment, the end light module/each of the end light modules of the elongated aircraft cabin light comprises a light directing element for directing light, emitted by the at least one light source of the end light module, in a downward direction, with the light directing element comprising at least one opening. The at least one opening may allow light, emitted from the at least one light source of the end light module, to pass through the light directing element for providing the upward light output.

Providing the end light module(s) with such a light directing element, which comprises at least one opening, allows for generating a downward light output and an upward light output with a single light directing element. In consequence, the cost and the weight associated with illuminating the floor and the ceiling of the passenger cabin, can be kept particularly low.

In an embodiment, the at least one opening has an outer periphery, in particular a surrounding surface defining the at least one opening. The outer periphery may be at least partly reflective. With the outer periphery being at least partly reflective, a convenient and effective means for providing a suitable light intensity of the upward light output, emitted via the at least one opening, may be provided. The efficiency of illuminating the ceiling with such an elongated aircraft cabin light may be particularly high.

In an embodiment, the at least one opening comprises an arch-shaped opening. The shape of the opening may be a curved shape, an arcuate shape, or the shape of a sector of an annulus. The shape of the at least one opening may in particular be selected to provide an upward light output having desired properties, in particular desired properties in terms of uniformity of illumination of the ceiling.

In an embodiment, a surface defining a lower periphery of the at least one opening may be at least partially reflective. In this way, a light output that is inherently angled upwards may be conveniently achieved for providing the upward light output, provided by the elongated aircraft cabin light.

In an embodiment, one or more or all of the light directing elements, as described above, are at least partly reflective. In particular, the one or more light directing elements of the end light module and/or the one or more light directing elements of the intermediate light modules may be at least partly reflective. The light directing element(s) may in particular include respective inclined reflective surface(s). This may apply to one or some or all of the light directing elements of the elongated aircraft cabin light.

The inclination angle of the respective reflective surface may be defined with respect to the longitudinal direction of the elongated aircraft cabin light. The reflective surface(s) may in particular be inclined at an angle in the range of between 30° and 60°, in particular at an angle in the range of between 40° and 50°, more particularly at an angle of about 45°, with respect to the longitudinal direction of the elongated aircraft cabin light. The reflective surface(s) may be substantially plane surface(s) or may be curved surface(s). In the case of curved surface(s), the stated inclination angles may be present at the intersection of the light directing element(s) and their support structure, such as the support board to which the at least one light source is mounted. Additionally/alternatively, it is possible that the stated inclination angles may be present at half the height of the light directing element(s), when looking at their tangent at said height. Depending on the desired illumination of the floor of the passenger cabin, substantially plane surface(s) or curved surface(s) may be used. Curved surface(s) may provide for a particularly uniform illumination of the floor.

Alternatively, the inclination angle of the respective reflective surface may be defined with respect to a straight down direction, or with respect to an end face of the elongated aircraft cabin light.

In an embodiment, at least one of the plurality of light modules comprises at least one light scattering structure for scattering light, emitted by the at least one light source of the respective light module. The light scatting structure(s) may be provided, in order to provide a diffuse light output/a highly uniform light output. Diffuse light outputs are more pleasant to passengers, and the risk of glaring passengers with the light outputs, emitted from the elongated aircraft cabin, light may be considerably reduced. Also, a more uniform illumination of the floor and/or the side wall and/or the overhead luggage bins and/or the ceiling may be achieved.

In an embodiment, at least one of the plurality of light modules comprises at least one lateral light scattering structure for providing at least one diffuse lateral light output.

In an embodiment, at least one of the plurality of light modules comprises at least one bottom light scattering structure for providing a diffuse downward light output.

One, some or all of the plurality of light modules of the elongated aircraft cabin light may be equipped with such a light scattering structure/with multiple such light scattering structures.

In an embodiment, a light scattering structure is provided on the light emitting end face of the end light module for providing a diffuse upward light output.

In an embodiment, the at least one light scattering structure includes a corrugated or undulated structure, formed of a light transmissive material.

In an embodiment, the at least one light scattering structure includes at least one lens structure and/or at least one prism lens formed of a light transmissive material for providing a diffuse light output.

In an embodiment, the at least one light scattering structure includes at least one holographic foil for providing a diffuse light output.

In an embodiment, at least some of the plurality of light modules are equipped with at least two light sources. The at least two light sources may provide light outputs having different light intensities and/or different color temperatures. The at least two light sources may be switchable independently of each other, in order to allow for selecting a desired light output intensity and/or a desired color temperature of the light outputs, emitted by the elongated aircraft cabin light, by selectively activating a particular one of the at least two light sources.

In an embodiment, each of a first subset of the plurality of light modules includes two different light sources and each of a second subset of the plurality of light modules includes three different light sources.

In an embodiment, the different light sources include at least two of a high-power light source, a medium-power light source for providing a dimmed light output, and a low-power light source for emergency operation.

In an embodiment, the high-power light sources are configured for emitting light with an intensity of 130 lm/W.

In an embodiment, the high-power light sources are configured for emitting light having a correlated color temperature (CCT) in the range of between 3600 K and 6300 K.

In an embodiment, the medium-power light sources are configured for emitting light with a lower intensity than the high-power light sources.

In an embodiment, the medium-power light sources are configured for emitting light having a lower correlated color temperature than the high-power light sources for providing a "warmer" light output. The medium-power light sources may in particular be configured for emitting light having a correlated color temperature in the range of between 2000 K and 3800 K.

In an embodiment, the high-power light sources and the medium-power light sources are switchably coupled to a first power supply, and the low-power light sources are electrically coupled to a second power supply, in particular to an emergency power supply. The second power supply may provide electric energy at a different voltage, in particular at a lower voltage, than the first power supply.

In an embodiment, the first power supply and the second power supply are configured for supplying electric DC power. In an alternative embodiment, at least one of the first and second power supplies may be configured for supplying electric AC power.

In an embodiment, the maximum light output intensity direction of the upward light output, when projected onto a vertical plane, is angled upward at an angle in the range of between 10° and 30°, in particular at an angle in the range of between 15° and 25°, with respect to the longitudinal direction of the elongated aircraft cabin light.

In an embodiment, with an opening angle of the upward light output being defined as the angular region in which the intensity of the upward light output is at least 10% of the maximum intensity of the upward light output, a horizontal opening angle of the upward light output, when projected onto a horizontal plane, is in a range of between 90° and 180°, in particular in a range of between 120° and 150°.

In an embodiment, a vertical opening angle of the upward light output, when projected onto a vertical plane, may be in a range of between 10° and 60°, in particular in a range of between 20° and 40°.

In an embodiment, each downward light output, including the supplementary downward light output, has a maximum intensity in a main downward light output direction and lower intensities in directions other than the main downward light output direction. The main downward light output direction, when projected onto a vertical plane, may be inclined at an angle in the range of between 80° and 100°, in particular at an angle of about 90°, with respect to the longitudinal direction of the elongated aircraft cabin light.

In an embodiment, an opening angle of each downward light output, including the supplementary downward light output, is defined as the angular region in which the intensity of the downward light output is at least 10% of a maximum intensity of the downward light output.

In an embodiment, a vertical opening angle of the downward light output, when projected onto a vertical plane running along the longitudinal direction of the elongated aircraft cabin light, of each of the plurality of intermediate light modules is in a range of between 60° and 120°, in particular in a range of between 75° and 105°, more particularly about 90°.

In an embodiment, a transverse opening angle of the downward light output, when projected onto a vertical plane running orthogonal to the longitudinal direction of the elongated aircraft cabin light, may be in a range of between 40° and 120°, in particular in a range of between 60° and 100°.

In an embodiment, the at least one lateral light output of each of the plurality of intermediate light modules has a batwing light distribution. The batwing light distribution may have two peak directions, which are not in the straight transverse direction, i.e. not at an angle of 90°, with respect to the longitudinal direction of the elongated aircraft cabin light. Rather, the peak directions may be angled somewhat forward and somewhat backward from the straight transverse direction. In this way, a particularly uniform illumination of the cabin wall and/or overhead luggage bins may be achieved.

In an embodiment, each lateral light output, including the supplementary lateral light output(s), has a maximum intensity in a main lateral light output direction or a maximum light intensity in two main lateral light output directions and lower intensities in directions other than the main lateral light output direction(s). When projected onto a horizontal plane, the main lateral light output direction may be at an angle in the range of between 80° and 100°, in particular at an angle of about 90°, with respect to the longitudinal direction of the elongated aircraft cabin light, in case there is a single main lateral light output direction. In case there are two main lateral light output directions, they may be at an angle in the range of between 50° and 80° and at an angle in the range of between 100° and 130° with respect to the longitudinal direction of the elongated aircraft cabin light.

In an embodiment, an opening angle of the lateral light output, including the supplementary lateral light output(s), is defined as the angular range in which the intensity of the lateral light output is at least 10% of the maximum intensity of the lateral light output, and the opening angle of each lateral light output, including the supplementary lateral light outputs, when projected onto a horizontal plane, may be in a range of between 90° and 180°, in particular in a range of between 120° and 150°.

In an embodiment, when projected onto a vertical plane, the opening angle of each lateral light output, including the supplementary lateral light output(s), may be in a range of between 10° and 60°, in particular in a range of between 20° and 40°.

Exemplary embodiments of the invention also include an aircraft, in particular a passenger aircraft, which is equipped with at least one elongated aircraft cabin light according to an exemplary embodiment of the invention. The additional features, modifications and effects described above with respect to an elongated aircraft cabin light apply to the aircraft in an analogous manner. The aircraft may in particular be an airplane or a helicopter.

An aircraft according to an exemplary embodiment of the invention may include a plurality of elongated aircraft cabin lights according to exemplary embodiments of the invention. The plurality of elongated aircraft cabin lights may in particular be arranged in an elongated arrangement along a longitudinal extension of the passenger cabin.

In an embodiment, the plurality of elongated aircraft cabin lights are spaced by between 1 m and 3 m, in particular by between 1.5 m and 2.5 m, from each other.

In an embodiment, the aircraft comprises a plurality of elongated aircraft cabin lights, which are spaced apart from each other along a lateral extension of the passenger cabin. Such an arrangement may in particular be suitable where two or more aisles run along the passenger cabin in parallel.

BRIEF DESCRIPTION OF THE DRAWINGS

Further exemplary embodiments of the invention are described in the following with respect to the accompanying drawings, wherein.

DETAILED DESCRIPTION

Figure 1:
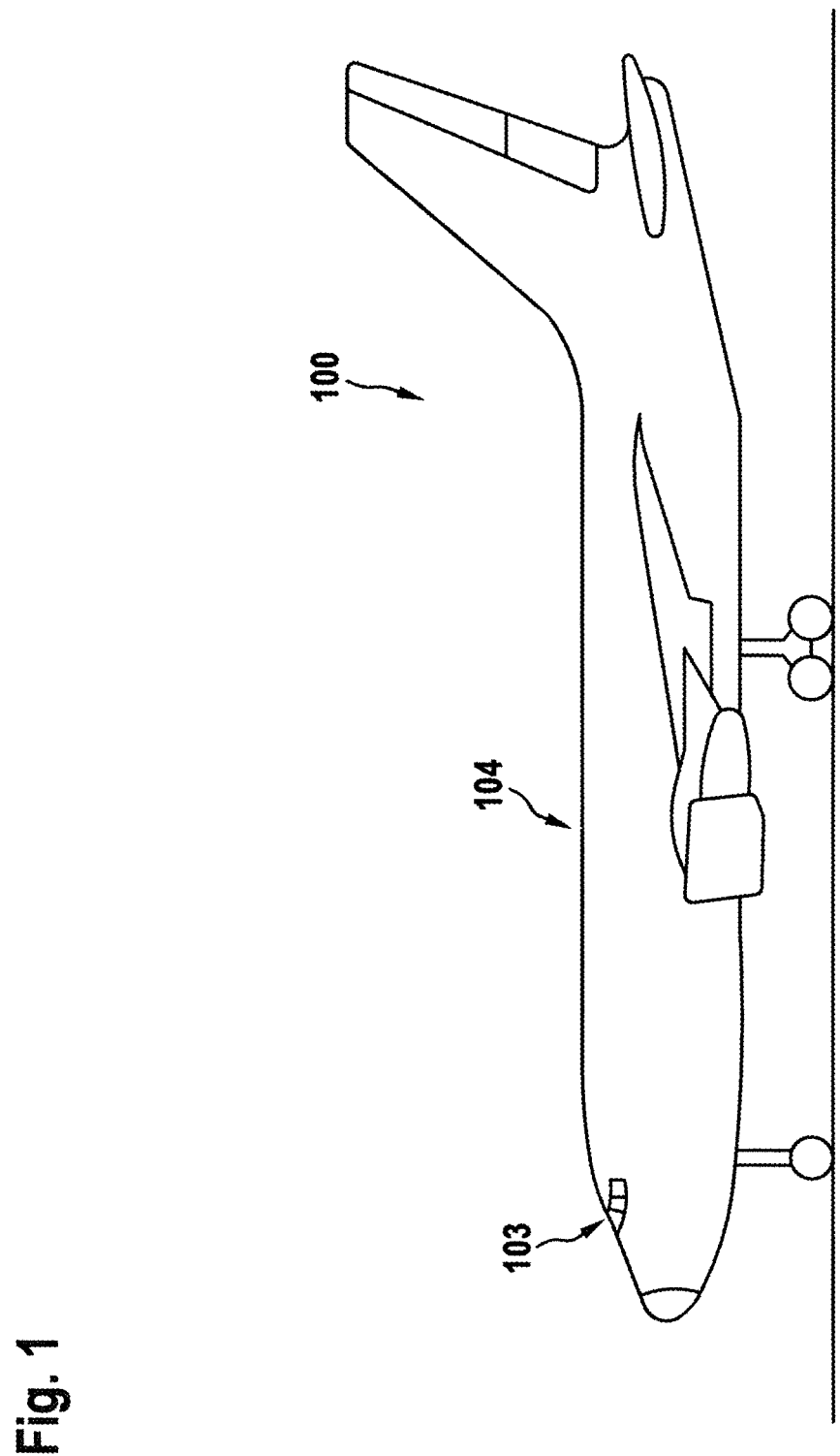
FIG. 1 depicts a schematic side view of an aircraft in accordance with an exemplary embodiment of the invention, in which a plurality of elongated aircraft cabin lights according to an exemplary embodiment of the invention are installed.

FIG. 1 depicts a schematic side view of an aircraft 100, in particular of an airplane, in accordance with an exemplary embodiment of the invention. In the exemplary embodiment shown in FIG. 1, the aircraft 100 is a large passenger airplane, comprising a cockpit 103 and a passenger cabin 104. The aircraft 100 may be a commercial passenger airplane, a private airplane, or a military aircraft. It is also possible that the aircraft is a rotorcraft, such as a helicopter.

Figure 2:
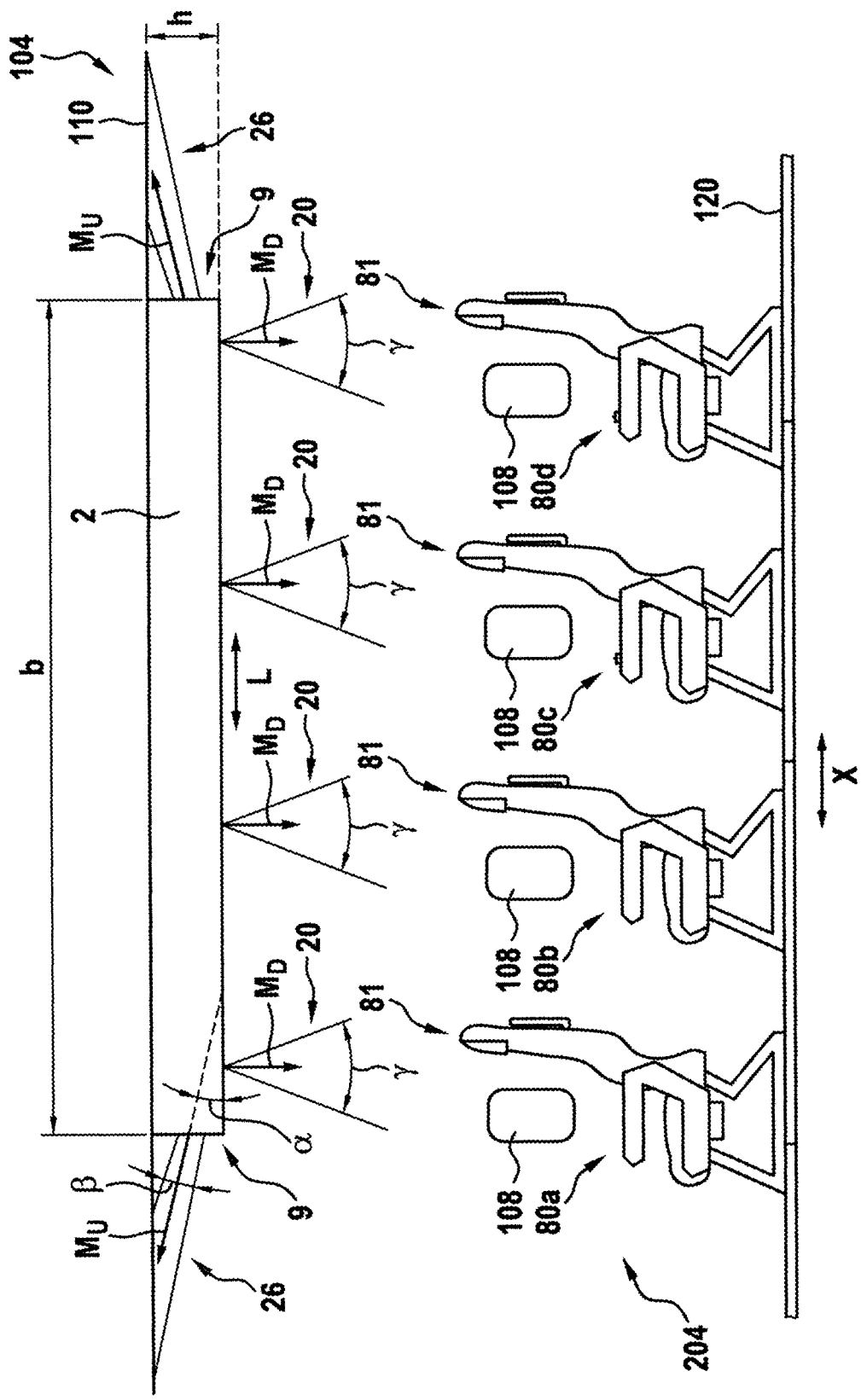
FIG. 2 depicts a schematic longitudinal cross-sectional view of a section of a passenger cabin of the aircraft of FIG. 1.

FIG. 2 depicts a schematic longitudinal cross-sectional view of a section of the passenger cabin 104 of the aircraft 100, which is shown in FIG. 1.

Figure 3:
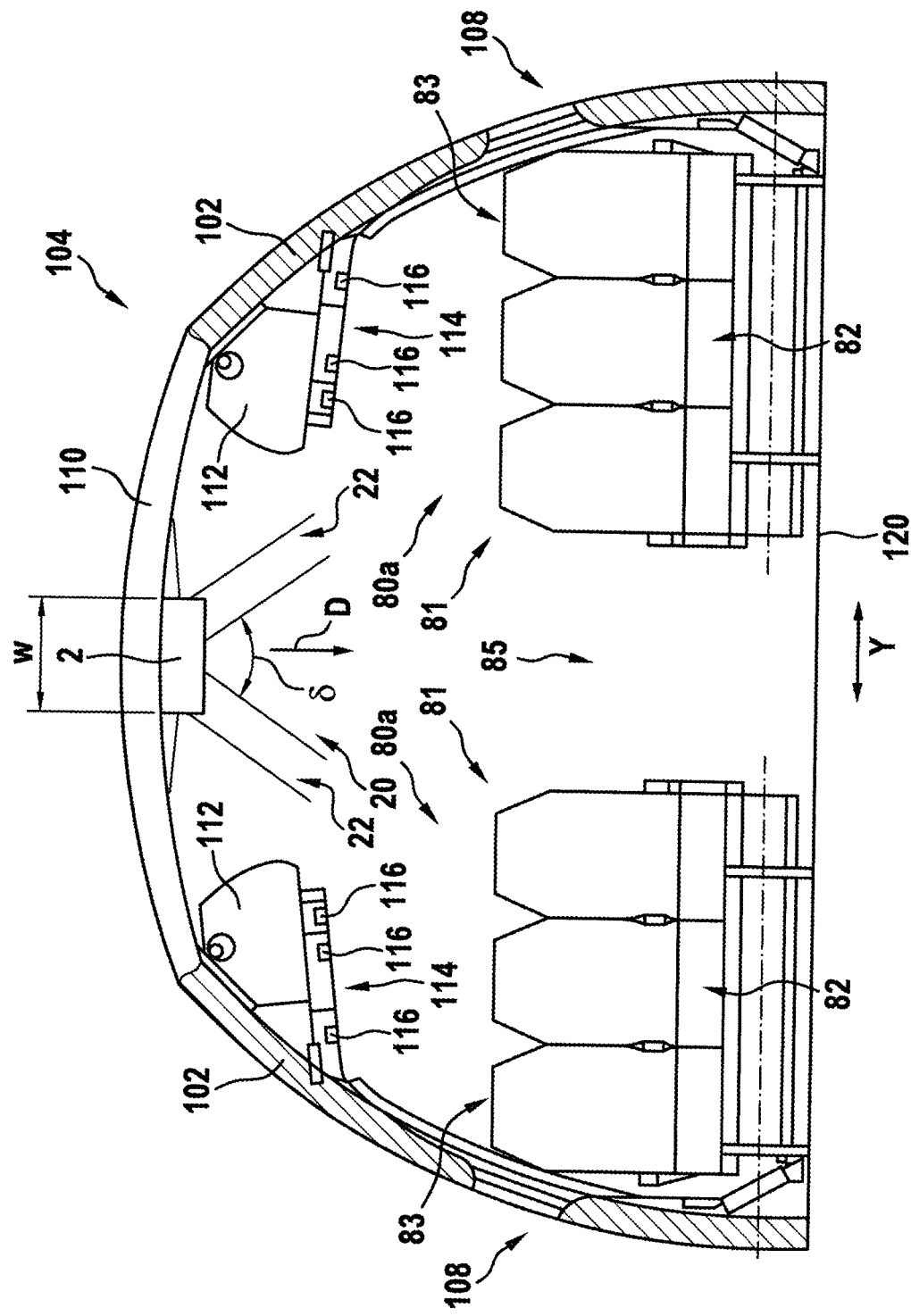
FIG. 3 depicts a schematic lateral cross-sectional view of a portion of the passenger cabin of the aircraft shown in FIG. 1.

FIG. 3 depicts a schematic partial cross-sectional view of the passenger cabin 104 in a plane which is oriented in a lateral extension Y of the passenger cabin 104, i.e. in a plane which is perpendicular to the plane of the longitudinal cross-sectional view depicted in FIG. 2.

Four seats 81, which are also referred to as passenger seats 81, are visible in FIG. 2. Six passenger seats 81, 82, 83 are visible in FIG. 3.

The passenger seats 81, 82, 83 are mounted to a floor 120 of the passenger cabin 104. The passenger seats 81, 82, 83 are arranged in a plurality of seat rows 80a-80d. The seat rows 80a-80d are spaced apart from each other along a longitudinal extension X of the passenger cabin 104.

For each of the seat rows 80a-80d, a window 108a-108d is provided on each side of the passenger cabin 104, allowing passengers to view the outside of the aircraft 100. A plurality of overhead luggage bins 112, which provide storage space for the passengers' baggage, are provided above the passenger seats 81.

Each seat row 80a-80d includes a plurality of passenger seats 81, 82, 83. In particular, each seat row 80a-80d includes a group of three passenger seats 81, 82, 83 on each side of a central aisle 85, extending in the longitudinal extension X. The passenger seats 81, 82, 83 of each seat row 80a-80d are arranged next to each other along the lateral extension Y. The middle seats 82 and the window seats 83 are not visible in FIG. 2, as they are arranged behind and therefore hidden by the depicted aisle seats 81 of the respective seat row 80a-80d.

For illuminating the passenger cabin 104, an elongated aircraft cabin light 2 in accordance with an exemplary embodiment of the invention is mounted to a ceiling 110 of the passenger cabin 104. In particular, the elongated aircraft cabin light 2 is positioned above the aisle 85, which is formed between the two groups of passenger seats 81, 82, 83.

The elongated aircraft cabin light 2 may have a length b in the range of between 100 mm and 250 mm, in particular a length b in the range of between 150 mm and 200 mm.

The elongated aircraft cabin light 2 may have a width w in the range of between 10 mm and 25 mm, in particular a width w in the range of between 15 mm and 20 mm.

The elongated aircraft cabin light 2 may have a height h in the range of between 30 mm and 60 mm, in particular a height h in the range of between 40 mm and 50 mm.

One or more elongated aircraft cabin lights 2 may be arranged within the passenger cabin 104. A plurality elongated aircraft cabin lights 2 may be arranged one behind the other along the longitudinal extension X, with each elongated aircraft cabin light 2 configured for illuminating a section of the passenger cabin 104 along the longitudinal extension X.

The plurality of elongated aircraft cabin lights 2 may be spaced by between 1 m and 3 m, in particular by between 1.5 m and 2.5 m, from each other along the longitudinal extension X.

Although not explicitly shown in the figures, a plurality of elongated aircraft cabin lights 2, extending substantially parallel to each other, may be arranged laterally offset from each other along the lateral extension Y of the passenger cabin 104. Such plurality of elongated aircraft cabin lights 2 that extend substantially parallel to each other may in particular be installed in wide body aircraft 100, in which multiple aisles 85, which extend substantially parallel to each other, are formed between different groups of passenger seats. In such a configuration, at least one elongated aircraft cabin light 2 may be installed above each of the aisles, respectively.

Passenger service units 114, including personal reading lights 116, are installed above the passenger seats 81, 82, 83. The passenger service units 114 may include further functional components such as gaspers, switches, loudspeakers and illuminated visual signs, which are not explicitly shown in the figures.

Figure 4:
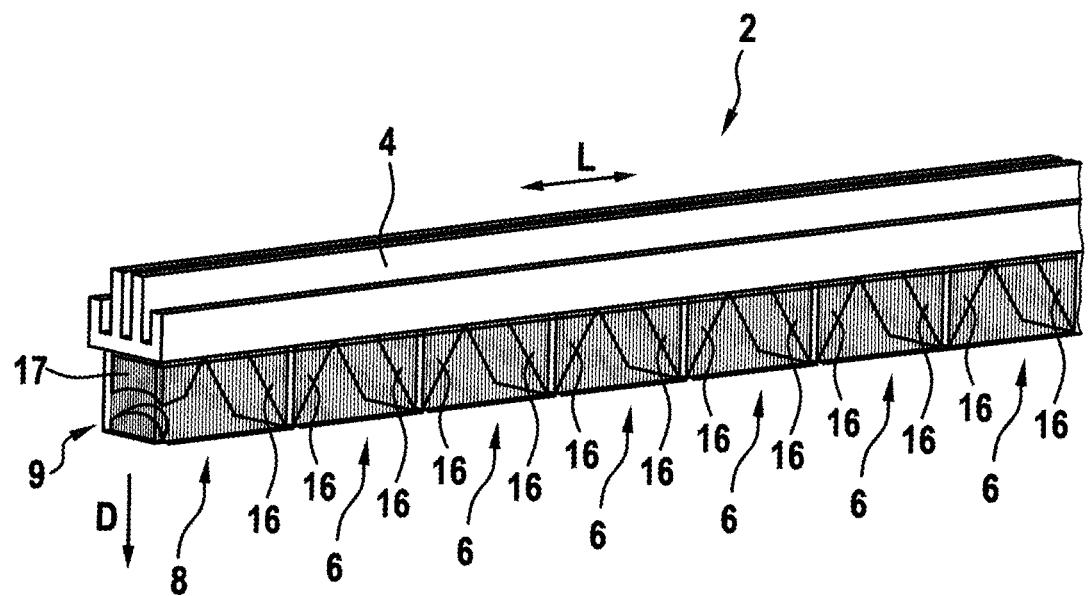
FIG. 4 depicts a perspective view of a section of an elongated aircraft cabin light according to an exemplary embodiment of the invention.
Figure 5:
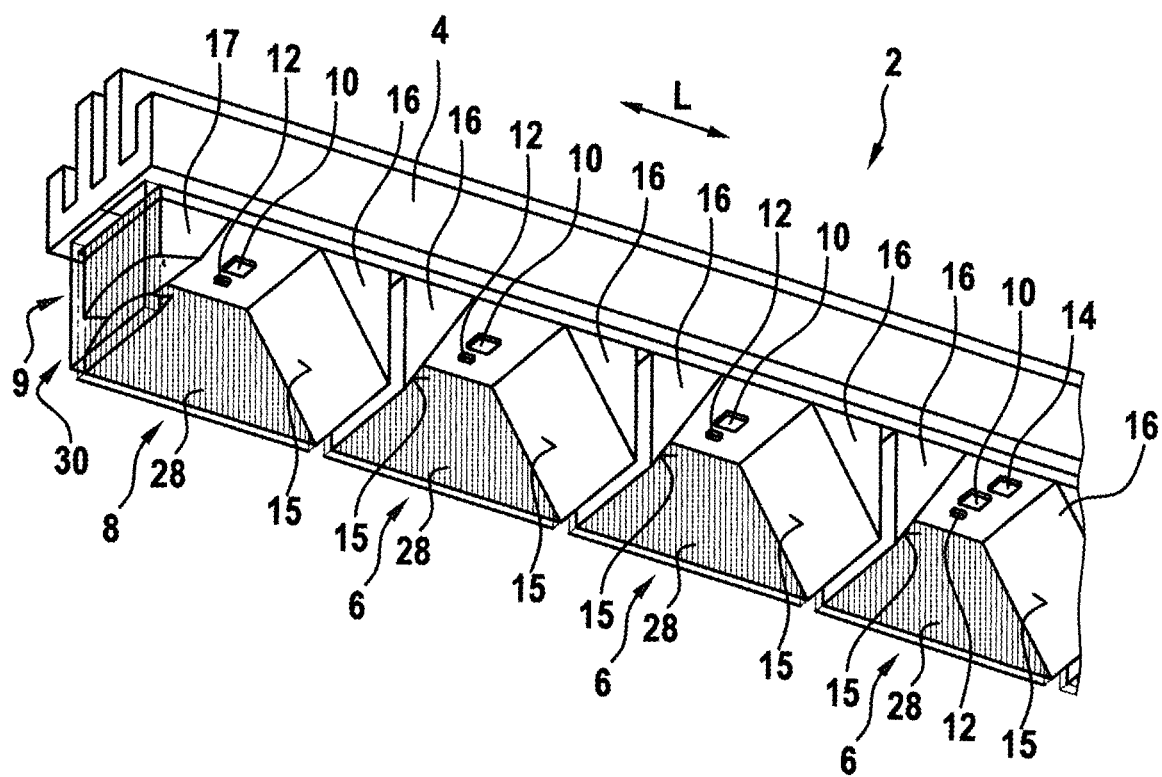
FIG. 5 depicts an enlarged perspective view of a section of the elongated aircraft cabin light depicted in FIG. 4.

FIG. 4 depicts a perspective view of a section of an elongated aircraft cabin light 2 according to an exemplary embodiment of the invention. FIG. 5 depicts an enlarged perspective view of a section of the elongated aircraft cabin light 2 depicted in FIG. 4, with a portion of a light scattering structure 28 being removed for providing a better view into the interior of the elongated aircraft cabin light 2.

The elongated aircraft cabin light 2, as depicted in FIGS. 4 and 5, comprises an elongated support 4, for example a support rail, extending along a longitudinal direction L of the elongated aircraft cabin light 2, and a row arrangement of a plurality of light modules 6, 8, which are arranged next to each other along the longitudinal direction L of the elongated aircraft cabin light 2.

The elongated aircraft cabin light 2 may in particular comprise between four and 12 light modules 6, 8. The elongated aircraft cabin light 2 may in particular comprise 4, 5, 6, 7, 8, 9, 10, 11, or 12 light modules 6, 8.

The elongated aircraft cabin light 2 is mounted to the ceiling 110 of the passenger cabin 104 of the aircraft 100 such that the longitudinal direction L of the elongated aircraft cabin light 2 is oriented substantially horizontally along the longitudinal extension X the passenger cabin 104, as it is depicted in FIGS. 2 and 3.

Each of the plurality of light modules 6, 8 is equipped with at least one light source 10, 12, 14 for emitting light from the elongated aircraft cabin light 2, in order to illuminate the passenger cabin 104.

The section of the elongated aircraft cabin light 2, depicted in FIG. 5, comprises three light modules 6, 8 equipped with two light sources 10, 12 and one light module 6 equipped with three light sources 10, 12, 14. The configuration depicted in FIG. 5 is, however, only an exemplary configuration. Other configurations, in which the light modules 6, 8 are equipped with more or less light sources 10, 12, 14 than depicted in FIG. 5, are possible as well.

Each of the light sources 10, 12, 14 may be an LED.

The light sources 10, 12, 14 may include first light sources 10, second light sources 12, and third light sources 14. The first light sources 10, the second light sources 12, and the third light sources 14 may be switchable independently of each other.

The first light sources 10, the second light sources 12, and the third light sources 14 may provide light outputs having different light intensities.

The first light sources 10 may be high-power light sources 10 for providing a bright illumination of the passenger cabin 104. The second light sources 12 may be medium-power light sources 12 for providing a dimmed, less intense, illumination of the passenger cabin 104. The third light sources 14 may be low-power emergency light sources for illumination of the passenger cabin 104 in an emergency situation.

The first light sources 10, the second light sources 12, and the third light sources 14 may also provide light outputs having different color temperatures.

The first light sources 10 may be configured for emitting light having a high correlated color temperature (CCT), in particular a correlated color temperature in the range of between 3600 K and 6300 K.

The second light sources 12 may be configured for emitting light having a lower correlated color temperature than the first light sources 10 for providing a "warmer" light output. The second light sources 12 may in particular be configured for emitting light having a lower correlated color temperature in the range of between 2000 K and 3800 K.

The first and second light sources 10, 12 may be electrically coupled to a standard power supply (not shown), for example to a DC bus providing electrical DC power at a voltage of 28 V. The third light sources 14 may be electrically coupled to an emergency power supply (not shown), for example a DC emergency bus providing electrical DC power at a voltage of 6 V. The mentioned voltages of 28 V and 6 V are, however, only exemplary, and the light sources 10, 12, 14 may be configured for being electrically coupled to other types of electric power supplies as well.

In the section of the elongated aircraft cabin light 2, depicted in FIGS. 4 and 5, the plurality of light modules 6, 8 of the elongated aircraft cabin light 2 include a plurality of intermediate light modules 6 and an end light module 8. The end light module 8 is arranged on an end of the row arrangement of the plurality of light modules 6, 8. Although only one end light module 8 is depicted in FIGS. 4 and 5, a second, similar end light module 8 may be provided at the opposing second end of the row arrangement of the plurality of light modules 6, 8.

Each of the plurality of intermediate light modules 6 comprises two light directing elements 16, which are arranged opposite to each other at the two longitudinal ends of the respective intermediate light module 6. The two light directing elements 16 are spaced along the longitudinal direction L. The light directing elements 16 are configured for directing light, emitted by the at least one light source 10, 12, 14, in a downward direction D for generating a downward light output 20 (see FIGS. 2 and 3) of the respective intermediate light module 6. The downward direction D is oriented downwards with respect to the horizontally extending longitudinal direction L. The downward light output 20 may in particular be employed for illuminating the floor 102 of the passenger cabin 104.

In the embodiment depicted in FIGS. 4 and 5, each of the two light directing elements 16 is provided with a reflective surface 15, which is inclined with respect to the longitudinal direction L for reflecting the light, emitted by the at least one light source 10, 12, 14, in the downward direction D.

The reflective surfaces 15 may in particular be inclined at an angle in the range of between 30° and 60° with respect to the longitudinal direction L.

Each of the plurality of intermediate light modules 6 is further configured for emitting at least one lateral light output 22 (see FIG. 3) towards at least one lateral side. The lateral light outputs 22 encompass the direction of lateral extension Y, running through the respective intermediate light module 6, with the direction of lateral extension Y being oriented transverse to the horizontally extending longitudinal direction L of the elongated aircraft cabin light 2. The intermediate light modules 6 may in particular be configured for emitting two lateral light outputs 22 towards two opposing lateral sides of the elongated aircraft cabin light 2, as it is schematically depicted in FIG. 3.

When the elongated aircraft cabin light 2 is mounted to the ceiling 110 of a passenger cabin 104, as it is depicted in FIGS. 2 and 3, the at least one lateral light output 22 may illuminate at least one overhead luggage bin 112 and/or a portion of a side wall 102 of the passenger cabin 104.

The end light module 8 is also configured for emitting a downward light output 20 in the downward direction D and at least one lateral light output 22.

In order to distinguish the downward light output 20 and the lateral light outputs 22, emitted by the end light module 8, from the downward light outputs 20 and the lateral light outputs 22, emitted by the intermediate light modules 6, the downward light output 20 and the lateral light outputs 22, emitted by the end light module 8, are denoted herein as supplementary downward light output 20 and supplementary lateral light outputs 22.

Figure 6:
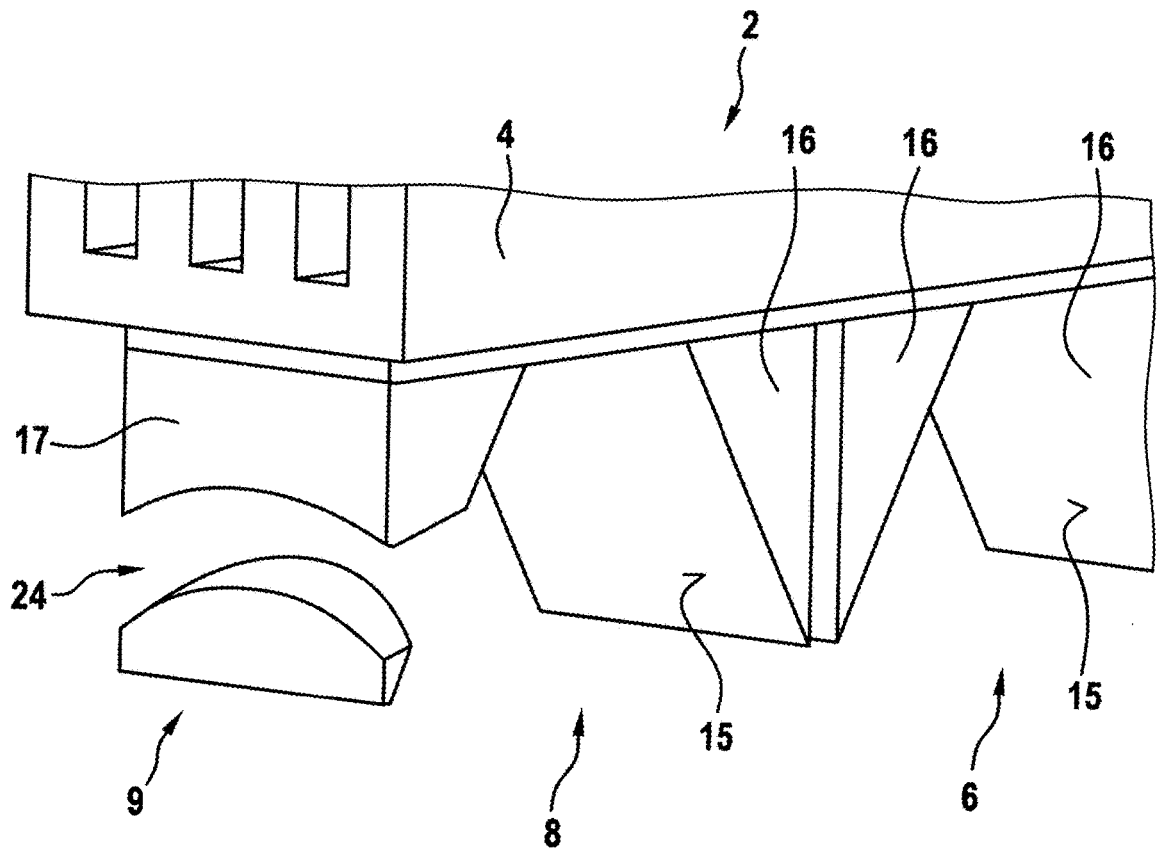
FIG. 6 depicts an enlarged perspective view of an end light module of the elongated aircraft cabin light depicted in FIG. 4.

FIG. 6 depicts an enlarged perspective view of an end light module 8.

In FIG. 6, the light scattering structures 28, 30, which are shown in FIGS. 4 and 5 and which will be described below, are not shown, in order to provide a better view into the interior of the end light module 8.

Similar to the intermediate light modules 6, the end light module 8 also comprises two opposing light directing elements 16, 17, provided with reflective surfaces 15, which are inclined with respect to the longitudinal direction L for reflecting light emitted by the at least one light source 10, 12, 14 in the downward direction D.

Contrary to the intermediate light modules 6, an opening 24 is formed in one of the light directing elements of the end light module 8. The light directing element having the opening 24 is denoted with reference numeral 17. Light emitted by the at least one light source 10, 12, 14 may pass through the opening 24 for providing an upward light output 26 (see FIG. 2) of the elongated aircraft cabin light 2.

In the representation of FIG. 6, the lower portion of the light directing element below the opening 24 is hanging in mid-air. This representation is chosen for an uncluttered view of the structure of the light directing element. It is understood that the lower portion of the light directing element has a suitable form of support. For example, the power portion of the light directing element can supported by the light scattering structures, which are not shown in FIG. 6, but shown in FIGS. 4 and 5. As another example, the lower portion of the light directing element can be attached to the upper portion of the light directing element by suitable support rods or the like.

In the embodiment of the elongated aircraft cabin light 2 depicted in FIGS. 4 to 6, the opening 24 is formed in one light directing element 17 of the end light module 8 and has a curved shape, in particular an arch-shape or a crescent shape. Depending on the geometries of the elongated aircraft cabin light 2 and the ceiling 110 of the passenger cabin 104 and depending on the position of the elongated aircraft cabin light 2 within the passenger cabin 104, the opening 24 may have a different shape for providing an appropriately shaped upward light output 26.

The periphery of the opening 24, provided within the light directing element 17, may be at least partially reflective for efficiently directing the light, emitted by the at least one light source 10, 12, 14, into a desired direction, in particular into an upward direction.

The upward light output 26 of the elongated aircraft cabin light 2, which is emitted from an end face 9 of the end light module 8 around the longitudinal direction L, has a maximum light output intensity direction MU. For illuminating the ceiling 110 of the passenger cabin 104, the maximum light output intensity direction MU is angled upwards with respect to the longitudinal direction L of the elongated aircraft cabin light 2, as it is depicted in FIG. 2.

When projected onto a vertical plane, running along the longitudinal direction L, the maximum light output intensity direction MU of the upward light output 26 may in particular be oriented at an angle $\alpha$ in the range of between 10° and 30°, in particular at an angle $\alpha$ in the range of between 15° and 25°, with respect to the longitudinal direction L of the elongated aircraft cabin light 2.

An opening angle of the upward light output 26 may be defined as the angular region in which the intensity of the upward light output 26 is at least 10% of the maximum intensity of the upward light output 26.

The opening angle $\beta$ of the upward light output 26, when projected onto a vertical plane running along the longitudinal direction L, may be in a range of between 10° and 60°, in particular in a range of between 20° and 40°.

The opening angle of the upward light output 26, when projected onto a horizontal plane, may be in a range of between 90° and 180°, in particular in a range of between 120° and 150°.

The lateral light outputs 22, including the supplementary lateral light outputs 22, may have a batwing light distribution.

An opening angle of the lateral light output 22 may be defined as the angular region in which the intensity of the lateral light output 22 is at least 10% of the maximum intensity of the lateral light output 22.

When projected onto a horizontal plane, the opening angle of each lateral light output 22, including the supplementary lateral light outputs 22, may be in a range of between 90° and 180°, in particular in a range of between 120° and 150°.

When projected onto a vertical plane, the opening angle of each lateral light output 22, including the supplementary lateral light outputs 22, may be in a range of between 10° and 60°, in particular in a range of between 20° and 40°.

Each downward light output 20, including the supplementary downward light output 20, has a maximum intensity in a main downward light output direction MD and lower intensities in directions other than the main downward light output direction MD.

The main downward light output direction MD, when projected onto a vertical plane running along the longitudinal direction L, may be inclined at an angle in the range of between 80° and 100°, in particular at an angle of about 90°, with respect to the longitudinal direction L of the elongated aircraft cabin light 2.

An opening angle of each downward light output 20, including the supplementary downward light output 20, may be defined as the angle $\gamma$ in which the intensity of the downward light output 20 is at least 10% of a maximum intensity of the downward light output 20.

A vertical opening angle γ of the downward light output 20, when projected onto a vertical plane extending along the longitudinal extension X of the passenger cabin 104, of each of the plurality of light modules 6, 8 is in a range of between 60° and 120°, in particular in a range of between 75° and 105°, more particularly about 90°.

A transverse opening angle δ of the downward light output 20, when projected onto a vertical plane extending along the lateral extension Y of the passenger cabin 104, may be in a range of between 40° and 120°, in particular in a range of between 60° and 100°.

For providing diffuse lateral and upward light outputs 22, 26, each of the light modules 6, 8 may comprise at least one light scattering structure 28, 30 for scattering light, which is emitted by the at least one light source 10, 12, 14 of the respective light module 6, 8. As mentioned, in order to allow an unobstructed inside view into the light modules 6, 8, only some of the light scattering structures 28, 30 are shown in FIG. 5, and the light scattering structures 28, 30 are not shown in FIG. 6.

The intermediate light modules 6 may in particular comprise two lateral light scattering structures 28 for providing diffuse lateral light outputs 22. In the embodiment, depicted in FIGS. 4 to 6, the lateral light outputs 22 and the downward light output 20 can be distinguished by determining the portion of the light that leaves the intermediate light modules 6 through the lateral light scattering structures 28 and the portion of the light that does not travel through the lateral light scattering structures 28.

The end light module 8 may comprise two lateral light scattering structures 28 for providing diffuse lateral light outputs 22 and/or an end face light scattering structure 30 for providing a diffuse upward light output 26. In the embodiment, depicted in FIGS. 4 to 6, the supplementary lateral light outputs 22 and the supplementary downward light output 20 can be distinguished by determining the portion of the light that leaves the end light module 8 through the lateral light scattering structures 28 and the portion of the light that does not travel through the lateral light scattering structures 28 and that does not travel through the at least one opening 24.

Although not explicitly depicted in the figures, the intermediate light modules 6 and the end light module 8 may further comprise downward light scattering structures for providing diffuse downward light outputs 20.

The light scattering structures 28, 30 may include panes made of a light transmissive material, which are provided with a corrugated/undulated surface for scattering the light passing though the panes.

The light scattering structures 28, 30 may also include prism lenses formed of light transmissive material and/or holographic foils for providing diffuse light outputs.

Alternatively or additionally, the panes may be at least partially made from frosted glass or another translucent material for providing diffuse light outputs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. The elongated aircraft cabin light for illuminating a passenger cabin of an aircraft from a ceiling of the passenger cabin, the elongated aircraft cabin light comprising:
   a row arrangement of a plurality of light modules, extending along a longitudinal direction (L) of the elongated aircraft cabin light;
   wherein each of the plurality of light modules comprises at least one light source and wherein the plurality of light modules include:
   a plurality of intermediate light modules; and
   on at least one end of the row arrangement, an end light module;
   wherein each of the plurality of intermediate light modules is configured for emitting a downward light output and at least one lateral light output towards at least one lateral side; and
   wherein the end light module is configured for emitting:
   a supplementary downward light output;
   at least one supplementary lateral light output towards at least one lateral side; and
   an upward light output, which is emitted from an end face of the end light module, wherein the upward light output has a maximum light output intensity direction (MU), which is angled upwards with respect to the longitudinal direction (L) of the elongated aircraft cabin light.

2. The elongated aircraft cabin light according to claim 1, wherein the end light module comprises a light directing element for directing light, emitted by the at least one light source of the end light module, downward, and wherein the light directing element comprises at least one opening that allows light from the at least one light source of the end light module to pass through for providing the upward light output.

3. The elongated aircraft cabin light according to claim 2, wherein the at least one opening has a periphery and wherein the periphery is at least partly reflective;
and/or
wherein the at least one opening comprises an arch-shaped opening.

4. The elongated aircraft cabin light according to claim 1, wherein each of the plurality of intermediate light modules comprises at least one light directing element for directing light, emitted by the at least one light source of the respective intermediate light module, downward; wherein each of the plurality of intermediate light modules in particular comprises two light directing elements.

5. The elongated aircraft cabin light according to claim 2, wherein the light directing element is at least partly reflective, wherein the light directing element in particular includes an inclined reflective surface.

6. The elongated aircraft cabin light according to claim 1, wherein at least some of the plurality of light modules comprise at least one light scattering structure for scattering light, emitted by the at least one light source of the respective light module, wherein at least some of the plurality of light modules in particular comprise at least one lateral light scattering structure and/or at least one bottom light scattering structure.

7. The elongated aircraft cabin light according to claim 1, wherein at least some of the plurality of light modules include at least two light sources, which provide light outputs of different light intensities and which are switchable independently of each other.

8. The elongated aircraft cabin light according to claim 7, wherein a first subset of the plurality of light modules include two different light sources and a second subset of the plurality of light modules include three different light sources, wherein the different light sources in particular include at least two of a high-power light source, a medium-power light source for dimmed operation, and a low-power light source for emergency operation.

9. The elongated aircraft cabin light according to claim 1, wherein the maximum light output intensity direction (MU) of the upward light output is angled at an angle ($\alpha$) in the range of between 10° and 30°, in particular at an angle ($\alpha$) in the range of between 15° and 25°, with respect to the longitudinal direction (L) of the elongated aircraft cabin light.

10. The elongated aircraft cabin light according to claim 1, wherein a horizontal opening angle of the upward light output is in in a range of between 90° and 180°, in particular in a range of between 120° and 150°.

11. The elongated aircraft cabin light according to claim 1, wherein a vertical opening angle ($\gamma$) of the downward light output of each of the plurality of intermediate light modules is in a range of between 60° and 120°, in particular in a range of between 75° and 105°, more particularly in a range of between 85° and 95°.

12. The elongated aircraft cabin light according to claim 1, wherein the at least one lateral light output of each of the plurality of intermediate light modules has a batwing light distribution.

13. An aircraft, such as an airplane or a helicopter, comprising:
   a passenger cabin with a ceiling; and
   at least one elongated aircraft cabin light according to claim 1;
   wherein the at least one elongated aircraft cabin light is mounted to the ceiling of the passenger cabin.

14. The aircraft according to claim 13, wherein the at least one elongated aircraft cabin light comprises a plurality of aircraft cabin lights, wherein the plurality of aircraft cabin lights are arranged along a longitudinal extension (X) of the passenger cabin and are spaced by between 1 m and 3 m, in particular by between 1.5 m and 2.5 m from each other.

15. A method of illuminating a passenger cabin of an aircraft with an elongate aircraft cabin light, which is mounted to a ceiling of the passenger cabin, the method comprising:
   with each of a plurality of intermediate light modules of the elongated aircraft cabin light, providing a downward light output for illuminating a floor portion of the passenger cabin and providing at least one lateral light output towards at least one lateral side for illuminating a side wall of the passenger cabin and/or one or more overhead luggage bins; and
   with at least one end light module of the elongated aircraft cabin light, providing a supplementary downward light output, at least one supplementary lateral light output, and an upward light output for illuminating a portion of the ceiling of the passenger cabin forward and/or aft of the elongated aircraft cabin light.

\* \* \* \* \*